United States Patent [19]

Iwata et al.

[11] 4,280,760
[45] Jul. 28, 1981

[54] FLASH CAMERA

[75] Inventors: Hiroshi Iwata, Nara; Tetsuo Yamaoka; Hajime Mitsui, both of Osaka, all of Japan

[73] Assignee: West Electric Company, Ltd., Osaka, Japan

[21] Appl. No.: 79,174

[22] Filed: Sep. 26, 1979

[30] Foreign Application Priority Data

Sep. 29, 1978 [JP] Japan ................. 53-120821

[51] Int. Cl.³ .................. G03B 7/24; G03B 7/26; G03B 15/05
[52] U.S. Cl. .................. 354/21; 354/33; 354/41; 354/43; 354/127; 354/149; 354/196; 354/289
[58] Field of Search .................. 354/21, 32–35, 354/41, 60 F, 127, 128, 139, 149, 145, 289, 43, 44, 60 R, 196

[56] References Cited

U.S. PATENT DOCUMENTS

| 3,678,829 | 7/1972 | Kaneko | 354/33 |
| 4,021,824 | 5/1977 | Uchiyama et al. | 354/33 |
| 4,153,355 | 5/1979 | Ikawa et al. | 354/33 |
| 4,162,836 | 7/1979 | Harrison | 354/139 |

Primary Examiner—L. T. Hix
Assistant Examiner—William B. Perkey
Attorney, Agent, or Firm—Cushman, Darby & Cushman

[57] ABSTRACT

A flash camera having features that an aperture control is made in accordance with the factors whether a film sensitivity is high or low and besides whether a flash apparatus is used, that a constant-voltage circuit of small power consumption is employed thereby enabling to flow current to a meter either continuously or before a photographing and to be free from exposure errors arising from a damping movement of a pointer of the meter and so on, and that an operation of the constant-voltage circuit is controlled by a change-over switch to compensate light intensity variations of a strobe apparatus when power source voltage varies.

10 Claims, 9 Drawing Figures

(a)

(b)

FLASH CAMERA

BACKGROUND OF THE INVENTION

1. Field of the Invention

The present invention relates to a flash camera with a built-in strobe, and more particularly concerns an automatic exposure controlling camera provided with and operatively connected with the built-in strobe.

2. Prior Art

As a driving means of an aperture control means in a conventional flash camera apparatus comprising an aperture control means using deflection angles of an electric indicator such as an ampere meter, the aperture has been controlled by supplying a photo-current to the indicator. The photo-current responds to an object intensity by using an optoelectro transducer made of silicon and selen. Since it is necessary that the photo-current is large to a certain extent for driving the indicator, a chip area of the optoelectro transducer needs to be large resulting in the problems of high costs and a large installation space. In addition, there was another problem in the optoelectro transducer made of selen which is relatively cheap that the transducer has a poor linearity and is liable to deteriorate.

As another driving means there has been another aperture controlling system where a photo-current responding to an object brightness is supplied to an indicator as described above, but an optoelectro transducer is made of mainly CdS. In that system a transducer operation is largely affected by a voltage variation of a power source and therefore a mercury battery capsule of supplying a stable voltage has been employed as the power source. Accordingly, this system has drawbacks that the device using CdS as the transducer is expensive and that the mercury battery has only a small capacity. When one forgets to turn off a power switch after use, the mercury battery is liable to discharge soon and the mercury battery has to be exchanged.

In order to avoid such trouble, it is devised in the abovementioned driving means that a switch which is for example interlocked with a shutter release button is provided in a loop including the mercury battery and the indicator. By such a configuration electric power is supplied to the indicator only when a photographing is made. But there has been still a problem of an exposure error arising from a response delay of the indicator for the object brightness and/or a damping movement of a pointer of the indicator when the shutter button is pushed down.

Moreover, there are several problems in a brightness check circuit (alarm circuit for insufficient brightness) of the abovementioned flash camera comprising the aperture control means using deflection angles of the indicator. There have been conventionally used, for example, the following two methods. One method is an indication method where an alarm mark is fixed to a part of the aperture control means, for example, to a locking means of the pointer or a stepped gear for the detection of the deflection angles of the indicator, and the alarm for the photographer is made by displaying the alarm mark in the finder. Another method is to lock the shutter release button when the object brightness is not sufficient for a photographing.

However, these two methods have drawbacks. In the former case it is difficult to observe the alarm mark in the finder when the photographer observes it in the dark. While in the latter case the mechanical configuration becomes extremely complex.

In the fundamental operation of the aperture control means of the so far described flash camera, it is further necessary that the deflection angle of the indicator's pointer is controlled by factors other than the object brightness. Such factors are film sensitivity and whether the built-in strobe is used when the photographing needs it. However, in the conventional flash camera the aperture control usually has nothing to do with the deflection angles of the indicator's pointer when the built-in strobe apparatus is used, and the aperture is simply controlled by the object distance. In other words, the so far described conventional flash camera usually comprises two aperture control means. One aperture control means operates responding to the deflection angles of the indicator's pointer, while the other control means is independent from the former and operates responding to other conditions such as object brightness when the built-in strobe is used. Accordingly, the mechanical configuration thereof has been quite complex. This results in several problems in the conventional flash camera, for example, an increase of number of parts, assembly difficulty and difficulty in making the camera body compact.

SUMMARY OF THE INVENTION

The present invention purports to provide a flash camera comprising an aperture control means where a large capacity battery is used for driving an indicator as well as a built-in strobe, a small amount of current is supplied to the indicator either continuously or before photographing in order to avoid an exposure error arising from a response delay of the indicator for the object brightness and/or a damping movement of a pointer of the indicator, and further a constant-voltage circuit is provided in order to avoid another exposure error arising from a voltage variation of the battery.

DETAILED DESCRIPTION OF THE INVENTION

The present invention purports to provides a flash camera comprising a strobe apparatus with a power source, an aperture control means for controlling an aperture by deflection angles of a pointer of an indicator, a first change-over switch for controlling a power supply from the power source to the aperture control means, a second change-over switch interlocked with the first change-over switch, and a voltage generating circuit for generating a driving voltage of said aperture control means.

Figure 1:
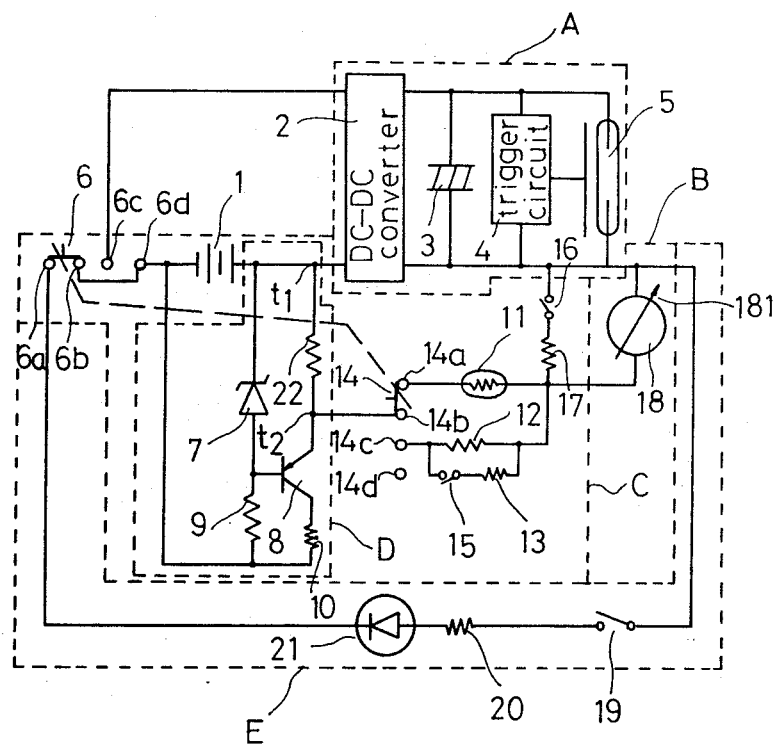
FIG. 1 is a view showing a circuit diagram of a flash camera in accordance with the present invention.

The present invention is elucidated in detail by referring to drawings. FIG. 1 shows an electric circuit of a flash camera in accordance with one embodiment of the present invention. The electric circuit of FIG. 1 comprises a strobe apparatus A, an aperture control means B, a driving means C for an indicator 18, a constant-voltage circuit D and an object scenery brightness check circuit E.

The strobe apparatus A makes a known operation. A main capacitor 3 is charged by a DC—DC converter circuit 2 when electric power is supplied from a power source 1. A discharge tube 5 flashes by discharging stored charges in the main capacitor 3. The discharging operation of the main capacitor 3 is controlled by a trigger circuit 4 synchronized with a shutter release button.

The aperture control means B contains the driving means C for the indicator 18 and the constant-voltage circuit D. The constant-voltage circuit D comprises a constant-voltage device 7 such as a Zener diode and a resistor 9 for generating a constant voltage, and further comprises resistors 10 and 22 and a transistor 8 for forming an impedance conversion circuit. The driving means C for the indicator 18 comprises two changeover switches 6 and 14 interlocked with each other and used for selecting either a first state or a second state in the flash camera operation. The first state corresponds to a time when an automatic photographing is made by an electric eye without using the strobe apparatus A, and is hereinafter referred to as an electric eye mode (EE mode for short). The second state corresponds to a time when a photographing is made by using the strobe apparatus, and is hereinafter referred to as a flash mode (FM mode for short). The driving means C for the indicator 18 further comprises a photoconductive device 11 and a resistor 12 which are connected to the indicator 18 in accordance with a selectional operation of the change-over switch 14. In short, the driving means C for the indicator 18 is constituted so as to supply a driving voltage to the indicator 18 after a voltage generated by the circuit D consisting of the constant-voltage device 7 and the resistor 9 is supplied to the impedance conversion circuit. The driving voltage is supplied to the indicator 18 either continuously or discontinuously in accordance with the selectional operation of the change-over switches 6 and 14.

The operation of the constant-voltage circuit D is as follows. When power is supplied from the power source 1 to the constant-voltage circuit D, a current flow path is formed by the constant-voltage device 7 and the resistor 9 thereby producing a constant voltage $V_Z$ across the constant-voltage device 7 determined by the characteristics thereof. The voltage $V_Z$ is applied to the impedance conversion circuit, to be exact, between the base of the transistor 8 and the resistor 22 thereby producing a voltage across the resistor 22. This voltage is always constant since the constant voltage $V_Z$ is not affected by the voltage variation within the life time of the power source 1. Therefore, the constant voltage is used to drive the indicator 18.

No power switch is provided to control the power supply of the power source 1 to the constant-voltage circuit D in the circuit of FIG. 1. It is naturally possible to provide a power switch in the loop formed by the power source 1, the constant-voltage device 7 and the resistor 9. The power source 1 is also used for the strobe apparatus A and is preferably a large capacity battery, such as a mangan battery and an alkaline mangan battery.

The operation of the driving means C for the indicator 18 is as follows. The whole operation of the flash camera apparatus of the present invention is classified into two modes, EE mode and FM mode as described above.

(a) In EE mode:

In the EE mode, factors for determining the aperture control are a shutter speed, an object brightness and a grade of film sensitivity in use. A constant shutter speed is used in the flash camera apparatus of the present invention. The object brightness is detected by the photoconductive device 11. The driving means C for the indicator 18 further comprises a switch 16 which is controlled in accordance with which grade of film sensitivity is used.

The interlocked change-over switches 6 and 14 are set to the state as shown in FIG. 1. Terminals 6a and 6b of the change-over switch 6 are connected, whereas terminals 14a and 14b of the change-over switch 14 are connected so that a current flow path is formed by the resistor 22, the photoconductive device 11 and the indicator 18.

Accordingly, to the indicator 18 flows a current determined by the constant voltage across the resistor 22 and by a resistance of the photoconductive device 11 responding to the object brightness. The current therefore varies responding to the object brightness. This means that the deflection angles of a pointer 181 of the indicator 18 correspond to the object brightness. The aperture control is made by utilizing the deflection angles and therefore an E.E. photographing is automatically controlled in accordance with the object brightness.

It is further necessary that the aperture be also adjusted to correspond to the degree of the film sensitivity under use. This adjustment is made by the switch 16 in the aperture control means B by use of a difference in shape of film cartridges. The switch 16 is off when a film of high sensitivity is used, whereas it is on when a film of low sensitivity is used. A resistor 17 is connected parallel to the indicator 18 when the switch 16 is turned on. Then the deflection angles of the pointer 181 are varied thereby controlling the aperture in accordance with the film sensitivity. The deflection angle of the pointer 181 is naturally controlled by the resistance of the photoconductive device 11 irrespective of the on- and off-operation of the switch 16.

When the flash camera apparatus in accordance with the present invention is not provided with a power switch, the current always flows through the indicator 18. But this gives rise to no problem. Because, when the flash camera apparatus is not used, the camera body is usually put in a camera case, and therefore the resistance of the photoconductive device 11 can be regarded as extremely high and the current flowing through the indicator 18 is negligibly small with respect to the capacity of the power source 1. The electric power consumed in the loop of the constant-voltage device 7 and the resistor 9 gives rise to no problem, either. Because, the constant-voltage across the constant-voltage device 7 is impressed across the resistor 22 through the base and emitter of the transistor 8 thereby making the power consumed in the abovementioned loop constant irrespective of load current variations by the photoconductive device 11 and the indicator 18, and therefore, the consuming power in the loop can be adjusted as small as possible. Hitherto, the power consumption has been a serious problem when a mercury battery was used as the power source and besides the power consumption was large. However, in the driving means C for the indicator 18 of the present invention, there is no need to worry about waste of the power consumption and the photographer does not need to turn off the power switch. The interlocked change-over switches 6 and 14 could serve as the power switch. But as described above, the electric circuit of FIG. 1 is not provided with a power switch, and therefore the operational mechanism of the interlocked change-over switches 6 and 14 can be simplified a little.

This simplification is not possible, if a conventional constant-voltage circuit is used, where a load is directly connected to a constant-voltage device. We assume the following situation to compare the conventional case with the present invention. The constant-voltage device 7 and the resistor 9 were connected across the power source 1, and as a load the indicator 18 and the photoconductive device 11 were directly connected across the constant-voltage device 7. In this circuit configuration, it would be necessary to set the resistance of the resistor 9 small, in order to supply a large current corresponding to a maximum deflection angle to the indicator 18. This means that the power consumption by the constant-voltage device 7 and the resistor 9 can not be disregarded when the resistance of the photoconductive device 11 is high. Therefore, a power switch must be provided in the conventional circuit configuration.

On the contrary, in the electric circuit of FIG. 1 in accordance with the present invention, the power consumption is not a serious problem, and therefore it is not always necessary to provide a power switch in the electric circuit shown in FIG. 1.

(b) In FM mode:

In this mode the strobe apparatus A is used. When a constant shutter speed is used in the flash camera of the present invention, remaining factors for determining the aperture control are an object distance and a degree of film sensitivity. The flash camera is set to the FM mode by changing over the switch 6 to connect the terminal 6b to a terminal 6c. The power source 1 is therefore connected to the DC—DC converter 2, while the change-over switch 14 is also changed over to connect the terminal 14b to a terminal 14c.

Accordingly, the indicator 18 is electrically connected across two terminals $t_1$ and $t_2$ of the constant-voltage circuit D through the resistor 12 and/or a resistor 13 and a switch 15. On the other hand, the main capacitor 3 is charged. The switch 15 is controlled by a knob for setting an object distance, as will be described later. When the object distance is a large value, it is off, whereas it is on when the object distance is a small value. That is, the resistor 12 is connected to the indicator 18 for a far object distance, whereas the parallel component consisting of the resistors 12 and 13 is connected to the indicator 18 in series when the object distance is a small value.

The aperture control responding to the film sensitivity is made in the manner same as in the EE mode. The deflection angles of the pointer 181 of the indicator 18 are varied by the on- and off-operation of the switch 16 thereby controlling the aperture in accordance with the film sensitivity.

In an aperture control means by deflection angles of an indicator's pointer where a photoconductive device such as of CdS is used for an object brightness detection, the aperture control is usually made as follows. When the object brightness is high, the aperture is controlled to have a small opening. In this case the resistance of CdS is low and a large current flows thereby giving rise to a large deflection angle of the indicator's pointer. On the contrary, the aperture is controlled to have a large opening, when the object brightness is low. This time, the resistance of CdS is high and a small current flows thereby giving rise to a small deflection angle of the indicator's pointer.

When the switch 15 is off and the switch 16 is on, the current flowing through the indicator 18 is small thereby setting a large opening. When the switch 15 is on and the switch 16 is off, the current flowing through the indicator 18 is large thereby setting a small opening. When a film of high sensitivity is used and the object distance is large in the FM mode then, two switches 15 and 16 are turned off, and an opening is set smaller than that in the case where the switch 16 is on for a film of low sensitivity. This means that the aperture control is made in a manner that the photographic distance is not affected by film sensitivity. This is also true when the object distance is small.

An amount of a flash light is estimated by a guide number Gn given by $Gn = F \times d$, where F is a F number (stop value) and d is an illuminating distance. A film of high sensitivity has a larger guide number with respect to a low sensitivity film. This means that the effective amount of the flash light in the abovementioned control system increases when a film of high sensitivity is used. When a high sensitivity film is used, it is further possible to increase a depth of field by controlling the aperture to have a small opening. Moreover, it is also possible to extend a photographic distance when a photographing is made by using a high sensitivity film with an aperture opening for a low sensitivity film.

In the aperture control means B of the flash camera in accordance with the present invention, this is made by further changing over the change-over switch 6 to connect the terminal 6c to the terminal 6d (this state is referred to as a second state in the FM mode). In this state the power source 1 is continuously connected to the DC—DC converter 2, and the interlocked change-over switch 14 is also changed over so that the terminal 14c is connected to the terminal 14d. The indicator 18 is disconnected from the output terminals $t_1$ and $t_2$ of the constant-voltage circuit D, and therefore the pointer 181 does not deflect at all thereby giving rise to zero deflection angle. The aperture is accordingly controlled to have an opening still larger than that in the case of using a film of high sensitivity in the first state in the FM mode. Therefore, a range of a photographic distance can be further extended.

In order to simplify an indication mechanism for over-exposure and photographic distance, the change-over action of the change-over switch 6 from the first state to the second state in the FM mode is prohibited in the flash camera of the present invention, when the switch 15 turns on and the object distance is small. This prohibition has nothing to do with the film sensitivity (i.e. high or low) once the switch 15 is turned on. This situation will be described later.

Figure 2:
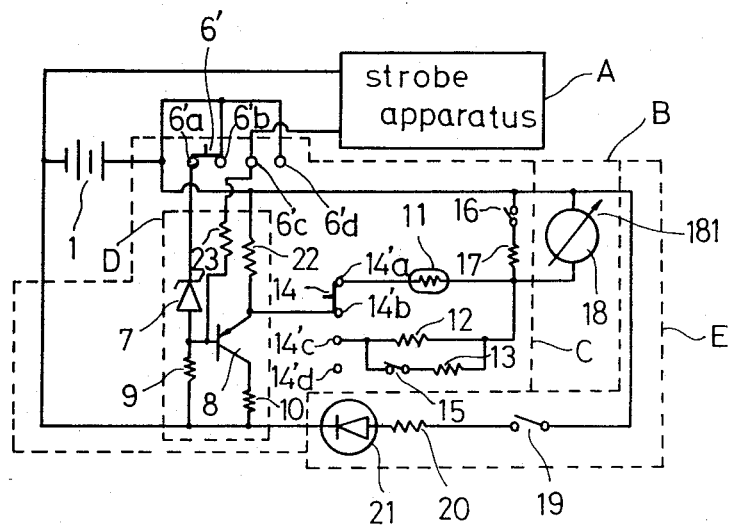
FIG. 2 is a view showing another circuit diagram of a flash camera in accordance with the present invention.

FIG. 2 shows another example of an aperture control means B. This aperture control means B of FIG. 2 is devised by still improving the aperture control means B of FIG. 1. Component devices of FIG. 2 with numerals same as those in FIG. 1 operate in a similar manner described above by referring to FIG. 1. Connection terminals of a constant-voltage circuit D are connected to a battery power source 1 under control of a change-over switch 6', which is interlocked with a change-over switch 14'. The operation of the electric circuit of FIG. 2 is as follows.

The operation in an EE mode, where terminals 6'a and 6'b and terminals 14'a and 14'b are respectively connected with each other, is carried out in a similar manner to the case in FIG. 1. The operation in an FM mode also has two states. But between a resistor 22 and the base of a transistor 8 is connected a resistor 23 instead of a constant-voltage device 7, when the change-over switch 6' is changed over to the FM mode. This means that a voltage supplying circuit is formed in the FM mode by the resistors 9, 10, 22 and 23 and the transistor 8. Accordingly, the voltage across the resistor 22 varies responding to the voltage variations of the power source 1 in the FM mode. In other words, the supplying current to the indicator 18 depends on the instantaneous voltage value of the power source 1, and the aperture is controlled responding to the voltage variation of the power source 1.

The voltage variation of the power source 1 is in fact monotonous (the power source voltage monotonously decreases) and the voltage across the resistor 22 gradually decreases thereby decreasing the current supplied to the indicator 18. Accordingly, the aperture is controlled so as to have a time-depending opening which widens as the power source voltage decreases. This time-depending control is very effective to compensate a decrease of a flash light amount, since the maximum amount of the flash light decreases as the power source voltage decreases.

Figure 3:
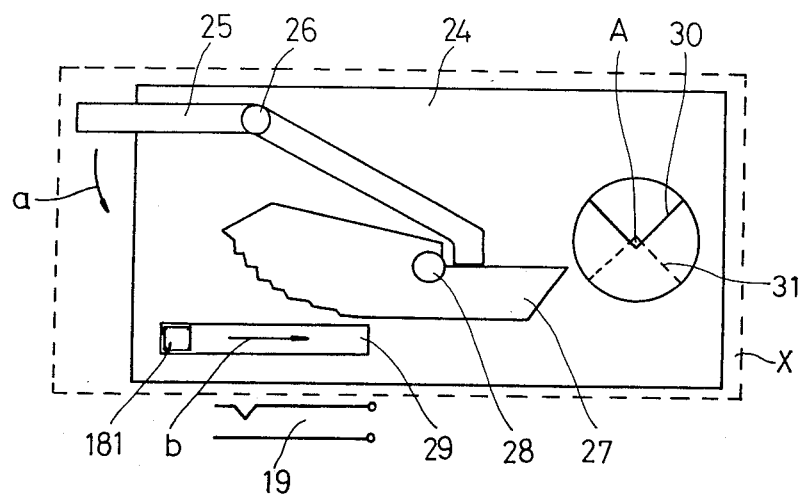
FIG. 3, FIG. 4 and FIG. 5 are schematic views showing operational states of an aperture control portion of the flash camera in accordance with the present invention.
Figure 4:
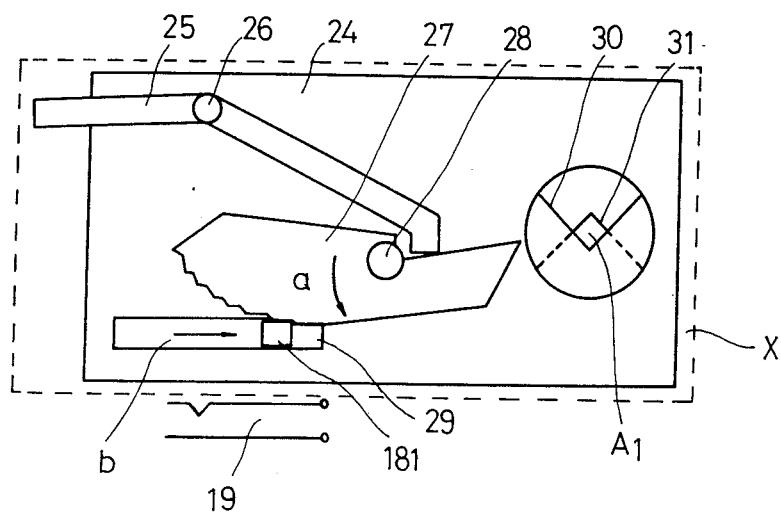
Figure 5:
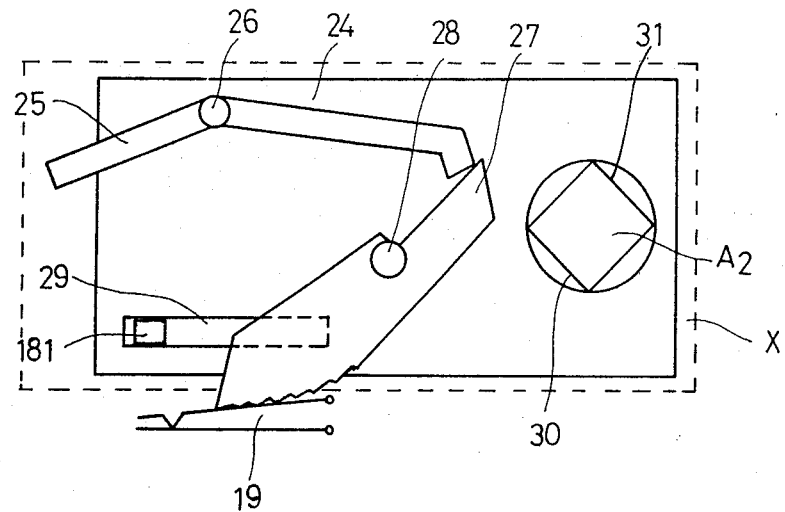

The operation of the object brightness check circuit E is as follows. The object brightness check circuit E comprises a switch 19, a resistor 20 and a light emitting device 21 such as a light emitting diode. The light emitting device 21 lights up in the EE mode when the switch 19 is turned on. A control operation of the switch 19 is elucidated by referring to FIGS. 3, 4 and 5. FIGS. 3, 4 and 5 show several controlling states of one example of an aperture controlling mechanical portion in accordance with the present invention.

A pin 26 is fixed at a base plate 24. A lever 25 is rotatable around the pin 26 in a direction indicated by an arrow a when a shutter release button (not shown) is pushed down. A stepped tooth 27 for a pointer detection rotates clockwise around a pin 28 fixed to the base plate 24 in a manner that the rotation thereof is always suppressed by the tip of the lever 25 and is made along with the rotation of the lever 25. A pointer 181 of an indicator (not shown) moves in a groove 29 formed at the base plate 24. Aperture blades 30 and 31 are controlled by the stepped tooth 27 and the pointer 181 to have an opening A in proportion to rotational angles thereof. A turn-on and off operation of the switch 19 is controlled by the stepped tooth 27. The indicator is not in operation and the pointer 181 is at a rest position in FIG. 3. A locking means is usually provided with the aperture control means in order to hold the pointer 181 before the stepped tooth 27 strikes the pointer 181. Such locking means is not shown in FIGS. 3–5.

The operation of the object brightness check circuit E in the EE mode is as follows. The current supplied to the indicator 18 is large when the object brightness is high and accordingly the resistance of the photoconductive device 11 is low. In this case the pointer 181 largely deflects and moves in the groove 29 in a direction indicated by an arrow b. If a shutter release button is pushed down at this moment, the lever 25 rotates in the direction indicated by the arrow a and at the same time the stepped tooth 27 rotates in the same direction. Accordingly, the aperture blades 31 and 32 also open wider until a small opening $A_1$ is formed when the rotational movement of the stepped tooth 27 is blocked by the pointer 181 as shown in FIG. 4. The stepped tooth 27 does not close the switch 19 when the object brightness is high. Therefore, the light emitting device 21 does not light up and no alarming is made for the photographer. The photographer does not need to worry about the object brightness since it is sufficient for the photographing. The opening $A_1$ is controlled by the pointer 181 responding to the object brightness, and thus the photographing with a correct exposure is accomplished when a shutter mechanism (not shown) is actuated by the pushing down action of the shutter release button.

The operation of the aperture control means in the FM mode is as follows. When the object brightness is low and thus the resistance of the photoconductive device 11 is high, then the current supplied to the indicator 18 is low and the pointer 181 deflects only a little. This means that the pointer 181 scarcely moves in the groove 29 from the rest position in the direction indicated by the arrow b. If the shutter release button is pushed down at this moment, the lever 25 and the stepped tooth 27 rotate in the direction indicated by the arrow a thereby widening the opening A. Contrary to the case in the EE mode, the rotation of the stepped tooth 27 is not obstructed by the pointer 181 and the stepped tooth 27 largely rotates thereby widening the aperture blades 30 and 31 to have a large opening $A_2$ as shown in FIG. 5. When the rotation of the stepped tooth 27 is not obstructed by the pointer 181, the switch 19 is closed by the stepped tooth 27. Accordingly, the light emitting device 21 (in FIG. 1) lights up and the photographer is warned that the object brightness is insufficient for the photographing without a flash light. It is naturally easy to observe this warning even in the dark, since the warning is made by the emitting light of the light emitting device 21.

Figure 6:
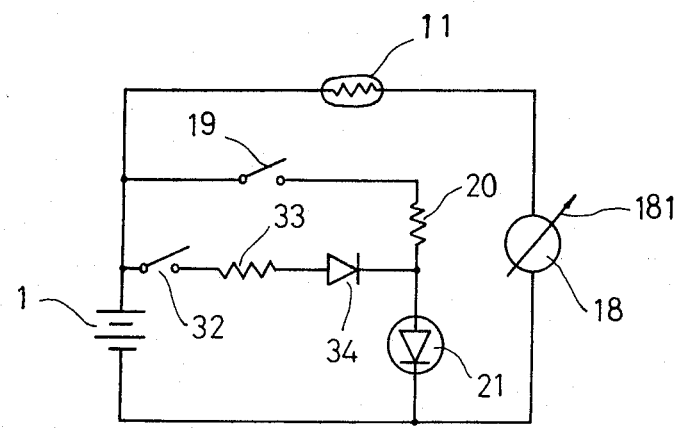
FIG. 6 is a view showing another example of a brightness check circuit of the flash camera in accordance with the present invention.

When the switch 19 is closed by the stepped tooth 27, the shutter release button is pushed down deeper than the case in the EE mode, but the pushing depth is smaller than that for actuating the shutter mechanism. The opening $A_2$ is extremely larger than the opening $A_1$, but it is used for the photographing. The light emitting device 21 can also be used for checking the power source voltage. This is accomplished by using a simple circuit, for example, which comprises an additional switch 32, a resistor 33 and a diode 34 as shown in FIG. 6.

The object brightness check circuit E described so far is simple and is correctly controlled by the switch 19 for the purpose of alarming when the object brightness is insufficient for the photographing without flash light.

Figure 7:
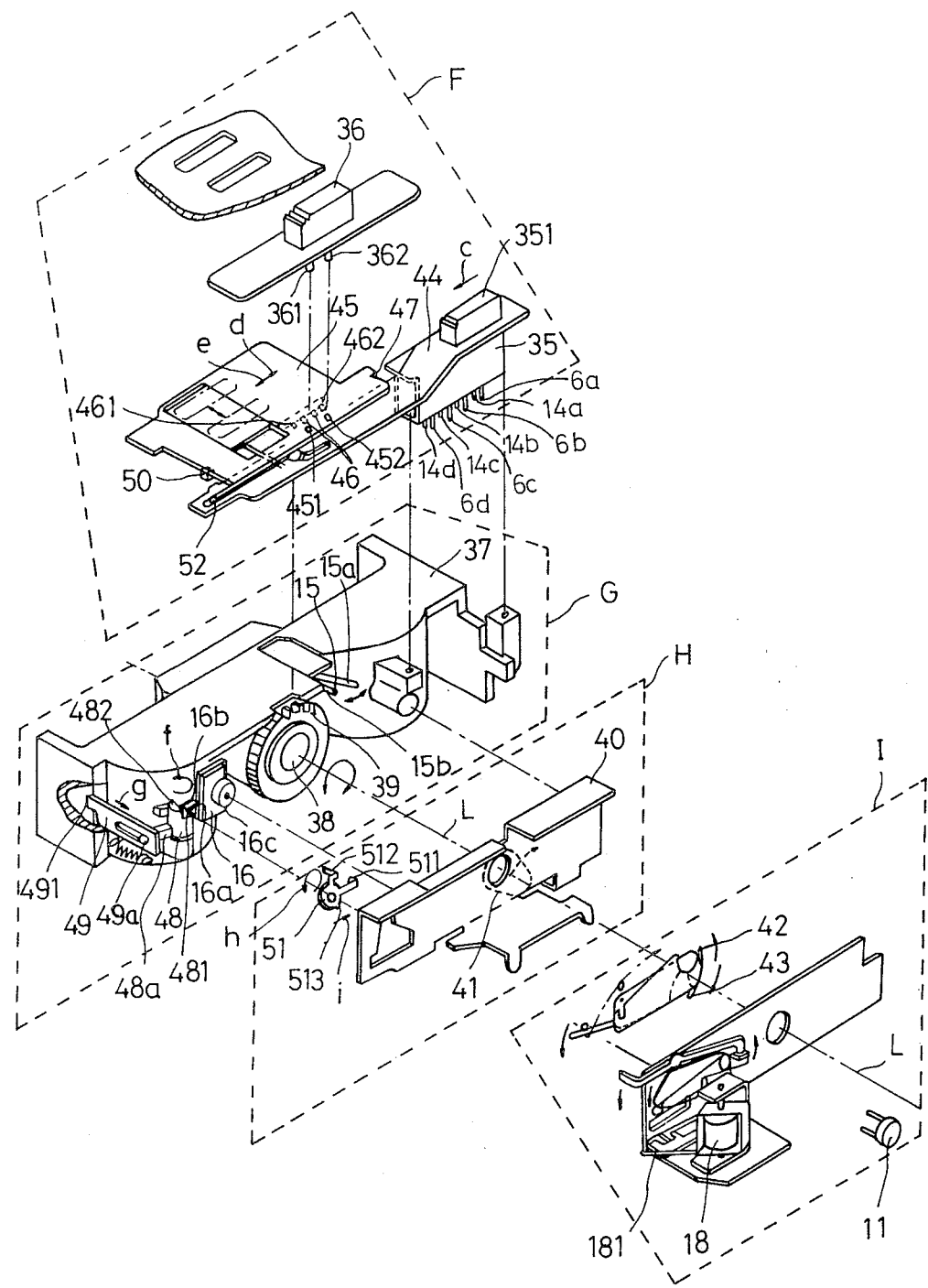
FIG. 7 is an exploded view showing several portions of the flash camera in accordance with the present invention.

The several switches in the electric circuit of FIG. 1 are mechanically controlled, and the control operation thereof is elucidated in detail by referring to FIG. 7. FIG. 7 is a perspective view showing several dismantled mechanical portions of the flash camera in accordance with the present invention. The mechanical portions of the flash camera comprise an operational portion F, a lens system portion G, a shutter mechanism portion H and an aperture setting portion I. The operational portion F comprises a change-over switch 35 with eight terminals, and a knob 36 for setting the photographic distance. The lens system portion G comprises switches 15 and 16, a case portion 37 for encasing a film cartridge therein, and a lens 38, with a movement thereof along an optical axis L being controlled by a toothed wheel 39. The shutter mechanism portion H comprises a base plate 40 and a shutter blade 41. The aperture setting portion I comprises an indicator 18 and aperture blades 42 and 43.

Change-over switches 6 and 14 have four terminals, respectively, and are built in the single change-over switch 35 so that they are interlocked with each other. The terminals of the two change-over switches 6 and 14 are designated as 6a, 6b, 6c and 6d, and 14a, 14b, 14c and 14d in a row as shown in FIG. 7. The change-over switch 35 can be changed over by two stages from the state in the drawing in a direction indicated by an arrow c. When the change-over switch 35 is changed over by a knob 351 in the direction indicated by the arrow c, then a sheet plate 44 fixed with the knob 351 also moves. It is natural that the change-over switch 35 can be changed over in the opposite direction after it is shifted.

The switch 15 is controlled by the knob 36 for setting the photographic distance. The photographic distance is set by the knob 36 in a manner that the lens 38 is shifted along the optical axis L. Protrusions 46 are disposed at the rear face of an indication plate 45. They engage with a toothed wheel portion around the lens 38. The lens 38 rotates when the indication plate 45 moves. On the other hand, protrusions 361 and 362 are provided at places under the knob 36 and are respectively inserted to holes 451 and 452 formed at the indication plate 45 so that the knob 36 is fixed to the indication plate 45. Therefore, the lens 38 moves when the knob 36 is shifted for setting the photographic distance.

In the drawing, a protrusion 461, which is situated on the most left-hand side of the protrusions 46, engages with the toothed wheel 39. In this situation it is not possible to move the lens 38 by moving the knob 36 for setting the photographic distance in a direction indicated by an arrow d. Therefore, the mechanical configuration is so devised that the knob 36 can only be moved from the drawn state in a direction indicated by an arrow e. The knob 36 moves in this direction up to a state that a protrusion 462, which is situated on the most right-hand side of the protrusions 46, engages with the toothed wheel 39. The photographic distance is set at these two limit position. In the example of FIG. 7, the drawn state corresponds to a state that the photographic distance is set to be large. And the other state, where the knob 36 is shifted uppermost in the direction indicated by the arrow e, corresponds to a state that the photographic distance is set to be small.

When the knob 36 for setting the photographic distance is moved in the direction indicated by the arrow e, a protrusion 47 disposed on the rear face of the indication plate 45 is similarly moved. It is so configurated that the protrusion 47 moves and presses a contact portion 15a in a manner that it is in contact with a contact portion 15b of the switch 15 when the most right-hand side protrusion 462 engages with the toothed wheel 39. On the contrary, the protrusion 47 is situated at a place where it does not make the contact portion 15a contact the contact portion 15b when the most left-hand side protrusion 461 of the protrusions 46 engages with the toothed wheel 39. The switch 15 is closed when the contact portion 15a contacts the contact portion 15b, and it is open when the contact portion 15a is not in contact with the contact portion 15b. Therefore, the switch 15 is off when the knob 36 is set for the large photographic distance, while the switch 15 is on when the knob 36 is set for the small photographic distance.

The switch 16 is mechanically controlled as follows. It comprises contact portions 16a and 16b and a holding means 16c for holding the contact portions 16a and 16b. The switch 16 is open when the contact portion 16a is not in contact with the contact portion 16b. The contact of the contact portions 16a and 16b is made by a protrusion 481 of a rotational means 48 when the latter rotates in a direction indicated by an arrow f. The rotational movement of the rotational means 48 in this direction is made by a detection means 49. A protrusion 48a moulded at the side of the rotational means 48 is inserted into and fixed at a hole 49a, and the detection means 49 is moved in a direction indicated by an arrow g when a film cartridge of low sensitivity is inserted in the case portion 37.

Figure 8:
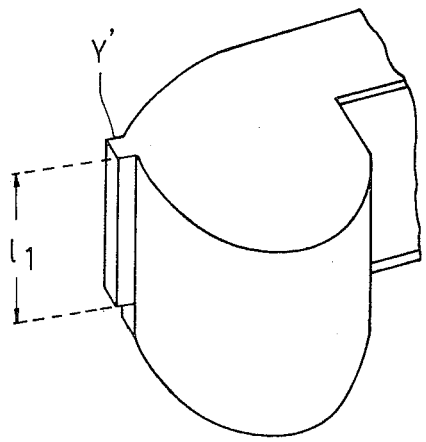
FIG. 8a and FIG. 8b are views showing shape of film cartridges for a low sensitivity film and a high sensitivity film, respectively.
Figure 8:
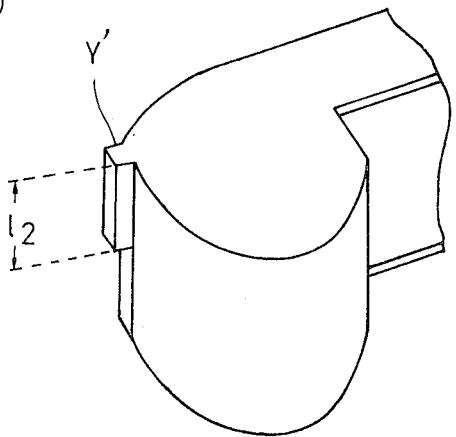

Usually, shapes of film cartridges are different in accordance with film sensitivity of the film under use whether it is high or low. FIG. 8(a) shows a film cartridge of a low sensitivity film. It has a protrusion Y of $l_1$ in length on one side of the cartridge. FIG. 8(b) shows a film cartridge of a high sensitivity film. It has a protrusion Y' of $l_2$ in length on one side of the cartridge. The length $l_1$ is longer than the length $l_2$. When the cartridge of the low sensitivity film is inserted into the case portion 37, then a projection 491 of the detection means 49 is pushed by the protrusion Y and the detection means 49 moves in the direction indicated by the arrow g. As described above, the movement of the detection means 49 actuates the rotational movement of the rotational means 48 by means of the protrusion 48a thereby pressing the contact portion 16a by the protrusion 481 and closing the switch 16. On the contrary, when the cartridge of the high sensitivity film is inserted into the case portion 37, then the projection 491 of the detection means 49 is not pushed by the protrusion Y' since the length $l_2$ is shorter than the length $l_1$. This means that the contact portion 16a is not pressed by the protrusion 481 and that the switch 16 is not closed.

The switches of the aperture control means B in accordance with the present invention are mechanically controlled as described above. It is also described earlier that the aperture control means B enables extending the photographic distance over that of the case of using a low sensitivity film, when the setting of the photographic distance is made to the large photographic distance and the photographing is made by using a high sensitivity film and a flash light. This is accomplished by the operation of the change-over switch 35, i.e. the change-over switches 6 and 14. As described earlier, in order to simplify the indication mechanism and to prevent an over-exposure, the change-over action of the change-over switch 6 from the first state to the second state in the FM mode is mechanically obstructed, when a low sensitivity film is used (the switch 15 is on) and the photographic distance is set to be small. This mechanical control is made in the flash camera of the present invention as follows.

The change-over switch 35 is manually controlled and can be shifted by two stages in the direction indicated by the arrow c. There are three states obtainable in the setting of the change-over switch 35. They are referred to as the EE state in the EE mode, and the first and the second states in the FM mode as before. In the EE state in the EE mode, the strobe apparatus A is not connected to the power source through the switch 6. The photoconductive device 11 and the indicator 18 are connected across the output terminals $t_1$ and $t_2$ of the constant-voltage circuit D through the change-over switch 14. When the change-over switch 35 is changed over by one stage, the terminal 6b is connected to the terminal 6c, and the indicator 18 and parallel elements comprising the resistor 12, the resistor 13 and the switch 15 are connected across the output terminals $t_1$ and $t_2$ of the constant-voltage circuit D. When the change-over switch 35 is further changed over by one more state, the strobe apparatus A is again connected to the power source 1 and the parallel elements are separated from the constant-voltage circuit D.

The state that the change-over switch 35 is changed over by one stage is hereinafter referred to as a first change-over stage state. The other state that the change-over switch 35 is changed over by two stages is hereinafter referred to as a second change-over stage state. In the mechanical configuration shown in FIG. 7, when the change-over switch 35 is changed over to the second change-over stage state, then it automatically returns to the first change-over stage state. The manual operation of the change-over switch 35 from the first change-over stage state to the second change-over stage state corresponds to the abovementioned operation for extending the photographic distance. When the change-over switch 35 is changed over from the first change-over stage state to the second change-over stage state, the strobe apparatus A is again connected to the power source through the terminals 6c and 6d and the parallel elements are separated from the constant-voltage circuit D. Therefore, the flash camera in accordance with the present invention is devised to be free from the over-exposure problem. The change-over operation of the change-over switch 35 from the first change-over stage state to the second change-over stage state is mechanically obstructed when a low sensitivity film is used and the small photographic distance is set. Such change-over operation is possible only when a high senstivity film is used in the FM mode and additionally the photographic distance is set to be large.

The change-over operation of the change-over switch 35 is mechanically controlled as described below. When the change-over switch 35 is changed over by the knob 351 in the direction indicated by the arrow c, then the sheet plate 44, and the knob 351 which is fixed thereto, also moves in the same direction. The sheet plate 44 is provided with a projection 52 on the tip thereof, and the projection 52 obstructs the movement of the plate 44 in the direction indicated by the arrow c when the projection 52 abuts on a projection 511 of the control means 51 which is rotatively fixed to the base plate 40. When the knob 36 for setting the photographic distance is shifted in the direction indicated by the arrow e and the small photographic distance is set, then the indication plate 45 with the projection 50 provided on the rear face thereof also moves in the same direction and the projection 50 abuts on a projection 512 of the control means 51 thereby rotating the control means 51 in a direction indicated by an arrow h. Then, the projection 511 of the control means 51 also rotates in the same direction and abuts on the projection 52 on the sheet plate 44. Therefore, the further movement of the sheet plate 44 in the direction indicated by the arrow c is obstructed so that the change-over switch 35 can not be changed over.

On the other hand, when a low sensitivity film is used, the detection means 49 is pushed thereby rotating the rotational means 48 in the direction indicated by the arrow f. Then, a protruded portion 482 of the rotational means 48 pushes the projection 513 of the control means 51 in a direction indicated by an arrow i. Accordingly, the control means 51 rotates in the direction indicated by the arrow h and the projection 511 of the control means 51 abuts on the projection 52 of the sheet plate 44. Therefore, the change-over action of the change-over switch 35 is again prohibited.

When the large photographic distance is set, the projection 50 does not abut on the projection 512 of the control means 51. And when a high sensitivity film is used in this setting of the photographic distance, the projection 482 of the rotational means 48 does not abut on the projection 513 of the control means 51 and the change-over operation of the change-over switch 35 in the direction indicated by the arrow c is not prohibited.

Moreover, the flash camera in accordance with the present invention also comprises the aperture setting portion I. The control operation of the aperture setting is clear from the description described above by referring to FIGS. 3, 4 and 5, and therefore it is not elucidated here.

In conclusion, the present invention provides an improved flash camera wherein the aperture control is made in accordance with the factors, for example whether the film sensitivity is high or low and besides whether the flash apparatus is used. The flash camera has other distinctive features that the constant-voltage circuit of small power consumption is employed thereby enabling the flow of current to the indicator either continuously or before the photographing and to be free from the exposure error arising from the damping movement of the indicator and so on, and that the operation of the constant-voltage circuit is controlled by the change-over switch to compensate the light intensity variations of the strobe apparatus when the power source voltage varies.

What is claimed is:
1. A flash camera comprising
a strobe apparatus with a battery power source,
an aperture control means for controlling an aperture by deflection angles of a pointer of an indicator,
a first change-over switch for controlling a power supply from said power source to said aperture control means,
a voltage generating circuit for generating a driving voltage of said aperture control means,
first series elements connected across said indicator and comprising a first resistor and a first switch for controlling turn-on and off operation of said first resistor in accordance with a degree of sensitivity of a film,
parallel elements comprising a second resistor, a photoconductive device for detecting an object intensity, and second series elements comprising a third resistor and a second switch being controlled in accordance with a setting of an object distance, and
a second change-over switch interlocked with said first change-over switch, said second change-over switch being for connecting said indicator to said photoconductive device and said parallel elements, and being for supplying a voltage of said voltage generating circuit to said indicator.

2. A flash camera of claim 1 further comprising an object brightness check circuit which comprises a third switch, a fourth resistor and a light emitting device.

3. A flash camera of claim 1 wherein said voltage generating circuit includes a constant-voltage device and an impedance conversion circuit including a transistor, wherein the base of said transistor is connected to said constant-voltage device.

4. A flash camera of claim 1 wherein said voltage generating circuit includes a constant-voltage device, a fifth resistor and an impedance conversion circuit comprising a transistor,
wherein said first change-over switch is for connecting said constant-voltage device to said power source when said strobe apparatus is not in operation, said fifth resistor is connected to said power source when said strobe apparatus is in operation, and the base of said transistor is connected to said constant-voltage device and said fifth resistor.

5. A flash camera of claim 1 comprising a single switch which comprises eight terminals for said first and said second change-over switches, wherein said first change-over switch is for separating said strobe apparatus from said battery power source and said second change-over switch is for connecting said photoconductive device and said indicator across output terminals of said voltage generating circuit in a first state, said first change-over switch is for actuating said strobe apparatus and said second change-over switch is for connecting said parallel elements and said indicator across said output terminals of said voltage generating circuit in a second state, and said first change-over switch is for actuating said strobe apparatus and said second change-over switch is for opening said output terminals of said voltage generating circuit.

6. A flash camera of claim 1 further comprising a detection means, a rotational means with a projection and two contact portions at said first switch, wherein said detection means is for detecting a difference of film sensitivity by shapes of film cartridges, and said detection means is for rotating said projection of said rotational means, and said rotational means is for pressing one of said two contact portions and closing said first switch.

7. A flash camera of claim 1 further comprising two contact portions at said second switch, a knob for setting a photographic distance, and an indication plate with a protrusion on the rear face thereof, wherein said knob is fixed to said indication plate, and said protrusion is for pressing one of said two contact portions and closing said second switch.

8. A flash camera of claim 5 further comprising an obstruction means to prevent said second change-over switch from opening said output terminals of said voltage generating circuit when at least one of said first switch and said second switch is on.

9. A flash camera of claim 2 wherein said third switch is disposed adjacent to a detection means for detecting said deflection angles of said pointer of said indicator, and is for being controlled by said detection means in accordance with said deflection angles of said pointer of said indicator.

10. A flash camera of claim 8 wherein said obstruction means comprises a plate with a first projection moving in accordance with a change-over operation of said first and said second change-over switches, and a control means with a second projection abutting on said first projection when said control means rotates, wherein
said control means comprises a first protrusion abutting on a third projection provided at a rotational means which is rotated by a detection means for a film cartridge, and
a second protrusion abutting a fourth projection on the rear face of an indication plate for changing over a photographic distance, and
said control means is rotatable by said rotational means for closing said first switch and by said indication plate for closing said second switch.

* * * * *